United States Patent [19]

Majoor

[11] 4,305,678
[45] Dec. 15, 1981

[54] COUPLING FOR A MILL ROLL

[75] Inventor: Hendrik Majoor, Beverwijk, Netherlands

[73] Assignee: Hoogovens IJmuiden, B.V., IJmuiden, Netherlands

[21] Appl. No.: 81,159

[22] Filed: Oct. 2, 1979

[30] Foreign Application Priority Data

Oct. 10, 1978 [NL] Netherlands ............... 7810169

[51] Int. Cl.³ .................... F16B 1/00; F16D 1/00
[52] U.S. Cl. ......................... 403/361; 403/369; 403/370; 403/371
[58] Field of Search ........... 403/361, 370, 371, 369, 403/374, 260, 333, 334; 72/36

[56] References Cited

U.S. PATENT DOCUMENTS

| | | | |
|---|---|---|---|
| 524,033 | 8/1894 | Turner | 403/333 |
| 3,279,870 | 10/1966 | Janiszewski | 403/370 X |
| 3,327,497 | 6/1967 | Amend et al. | |
| 3,779,037 | 12/1973 | Petros et al. | |
| 4,094,179 | 6/1978 | Okuda | |
| 4,118,135 | 10/1978 | Cooper | 403/361 |
| 4,134,700 | 1/1979 | Nelson et al. | 403/371 X |

FOREIGN PATENT DOCUMENTS

| | | |
|---|---|---|
| 514228 | 12/1930 | Fed. Rep. of Germany ...... 403/374 |
| 929287 | 6/1955 | Fed. Rep. of Germany . |
| 950782 | 10/1956 | Fed. Rep. of Germany . |
| 963597 | 5/1957 | Fed. Rep. of Germany . |
| 1190266 | 4/1965 | Fed. Rep. of Germany . |
| 1902665 | 8/1970 | Fed. Rep. of Germany . |
| 1475505 | 1/1974 | Fed. Rep. of Germany . |

Primary Examiner—James Kee Chi
Attorney, Agent, or Firm—Stevens, Davis, Miller & Mosher

[57] ABSTRACT

A coupling between a roll of a heavy rolling mill and a cardan shaft, wherein the roll and a connecting member are joined by a mortise-and-tenon joint with the roll having a projection and the connecting member having a recess to receive said projection, the joint being such as to prevent relative rotation. The leading end of the projection and the base of the recess have respectively a pair of mutually corresponding conical surfaces which are coaxial with the axis of the projection and are urged into engagement in order to align the axes of the roll and the connecting member.

In order to achieve rigid coupling of the roll and the connecting member, there is provided a split ring which in unmounted condition is axially movable along the said projection and which is radially compressible by closure of the split or splits to grip the said projection. The split ring and the mouth of the said recess have respectively a second pair of mutually corresponding conical surfaces which are coaxial with the axis of the projection.

There are pulling means for drawing the respective pairs of conical surfaces into engagement.

3 Claims, 4 Drawing Figures

COUPLING FOR A MILL ROLL

BACKGROUND OF THE INVENTION

1. Field of the Invention

The invention relates to a coupling for mill rolls, for use in the iron and steel industry to couple a roll with a cardan shaft.

2. Description of the Prior Art

It is known for the connection between the roll and a connecting member which transmits drive from a cardan shaft to be embodied as a mortise-and-tenon joint, secured against rotation. For this purpose, the roll is provided with a pin or projection and the connecting member with a hole or recess to receive the projection.

This type of coupling is used for slab rolls in slabbing mills and for roughing rolls and finishing rolls in hot strip mills. The drive for such heavy mill stands is supplied by an electric motor, the power of which after reduction in speed is split and led to two rolls by means of cardan shafts. The rolls are journalled in so-called chucks. During operation, the thickness of the rolled material in the gap between the two workrolls reduces, so that the chucks in the roll stand should be movable and in consequence the angle of the cardan shafts must be variable. The roll and the cardan shaft are coupled to each other by means of the connecting member.

Usually the connection between the roll and the connecting member is a mortise-and-tenon one, for which purpose the roll has a projection which fits with the least possible play into a hole in the connecting member. This play, however, is sufficient to allow the joint to be easily assembled and disassembled. This radial play required for assembly and disassembly is eliminated after assembly by means of a radial bolt. The connection can be secured against rotation by means of flats on the projection, corresponding key slots in the connecting member and feather keys (plate keys) in the keyways thus provided.

A problem arises in the operation of this known design of the connection between the workroll and the connecting member in that the connection is often damaged by the loads which arise during the heavy work which such rolls have to perform. The mortise and tenon have then to be repaired by welding the projection and spraying material into the hole and subsequent mechanical machining of both. This entails loss of production and high maintenance costs.

SUMMARY OF THE INVENTION

The assignees of the inventor have found that the cause of the problem is the heavy shocks which inevitably arise at the connection in the mill stand at the entry and the exit of the rolled material and by which the material of the projection and the connecting member is deformed at the location of the feather keys. The object of the invention is to form a coupling of the roll and the connecting member in such a way that they will remain as one unit during operation so that they cannot move with respect to each other and thus cannot be damaged.

According to the invention, a first pair of mutually corresponding conical surfaces are provided at the base of the recess and at the leading end of the projection of the roll, and a second pair of mutually corresponding conical surfaces are provided at the mouth of the recess and on a split ring which in uncompressed condition is axially movable along the projection. Means are provided for independently pulling the first and the second pairs of surfaces into engagement, thereby to provide a rigid connection.

It is remarked that a pair of conical surfaces at the base of the recess and on the leading end of the projection have previously been proposed, but this is in a different context and for the purpose of achieving axial alignment of the roll and the connecting member (see U.S. Pat. No. 4,094,179).

In the present invention two pairs of conical surfaces are arranged so as to achieve a rigid coupling without play which is nevertheless easily assembled and disassembled.

Although various different designs are conceivable for the pulling means, preferably the pulling means for the first pair of surfaces comprises at least one draw bolt which passes through the connecting member into the end of the projection. Preferably the pulling means for the second pair of surfaces comprises a hold-down ring extending around the projection and engaging the split ring and a plurality of draw bolts which draw said hold-down ring towards the connecting member.

It has appeared that with this construction the maintenance problem can be minimized and that the costs of maintenance of the projection on the roll and the connecting member are greatly reduced or eliminated. The connection according to the invention may not only be applied to a new mill roll stand, but can also be incorporated in an existing installation by modification of the existing rolls and connecting members.

BRIEF DESCRIPTION OF THE DRAWINGS

An embodiment of the invention will be described below by way of example and with reference to the accompanying drawing, in which:

FIG. 1 shows an electric motor 1 by which the rolls 5 are driven, via a reducer 2, a distributing gear box 3 and cardan shafts 4. The rolls 5 are journalled in chucks 6 in a roll frame of conventional construction which is not drawn in FIG. 1.

FIG. 2 shows the connecting member 7 which couples a cardan shaft 4 having slippers 8 on the one hand to a roll 5 provided with a projection or pin 9 on the other hand. A chuck 10 has been indicated schematically in this figure. A broken line indicates in FIG. 2 that the connection between the connecting member 7 and the projection 9 has a mortise-and-tenon construction, which is drawn in more detail in FIGS. 3 and 4, where the connecting member has been drawn rotated 90° with respect to FIG. 2. The feather keys 11 drawn in FIG. 4 have not been indicated in FIG. 3.

FIG. 3 shows that the bottom of the hole or recess in the connecting member 7 and the leading end of the projection 9 are provided with a pair of mutually corresponding conical surfaces 12, which are coaxial with the projection 9. Likewise, the mouth of the hole in the coupling member 7 and a split ring 13 around the projection are provided with another pair of mutually corresponding conical surfaces 14 also coaxial with the projection 9. The ring 13 is divided by one radial saw slit 15 as indicated in FIG. 3, and can be moved with some play along the projection 9 when not in the fully mounted position. A hold-down ring 17 is mounted on the projection 9 behind the split ring 13 and cooperates with schematically indicated draw bolts 18 which engage in screw-threaded bores in the member 7.

Figure 1:
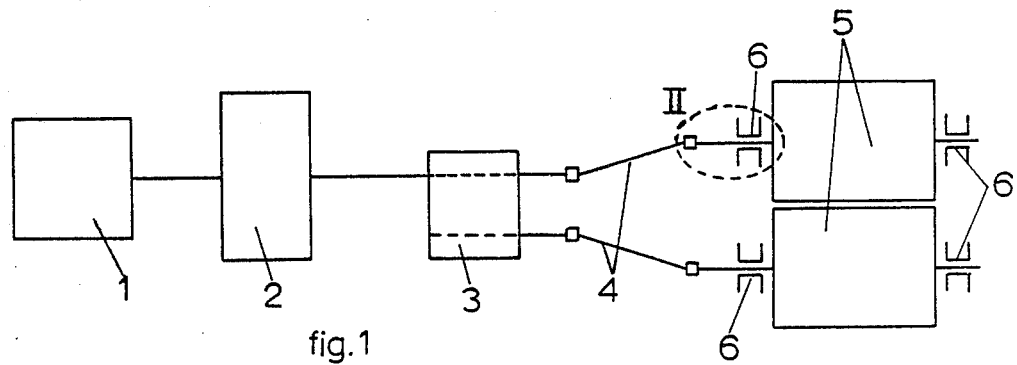
FIG. 1 schematically shows the driving gear of the rolls of a mill roll stand.
Figure 2:
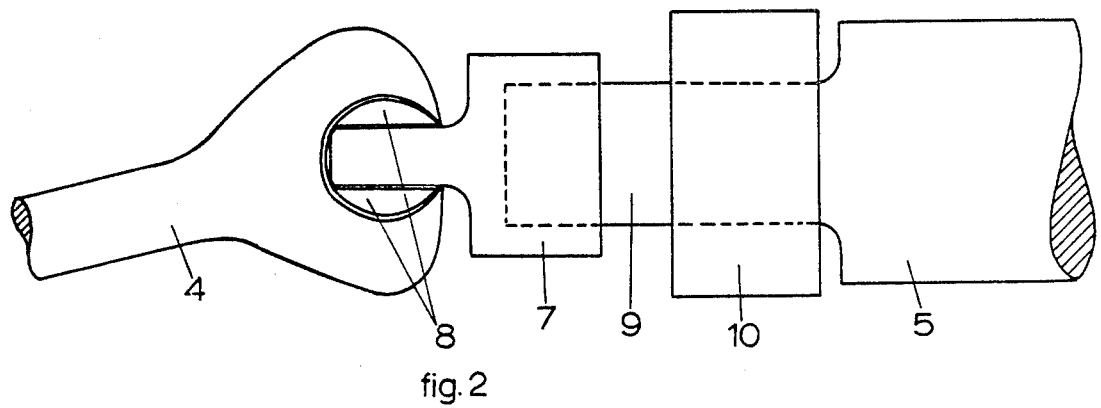
FIG. 2 is a sketch on a larger scale of detail II of FIG. 1.
Figures 3, 4:
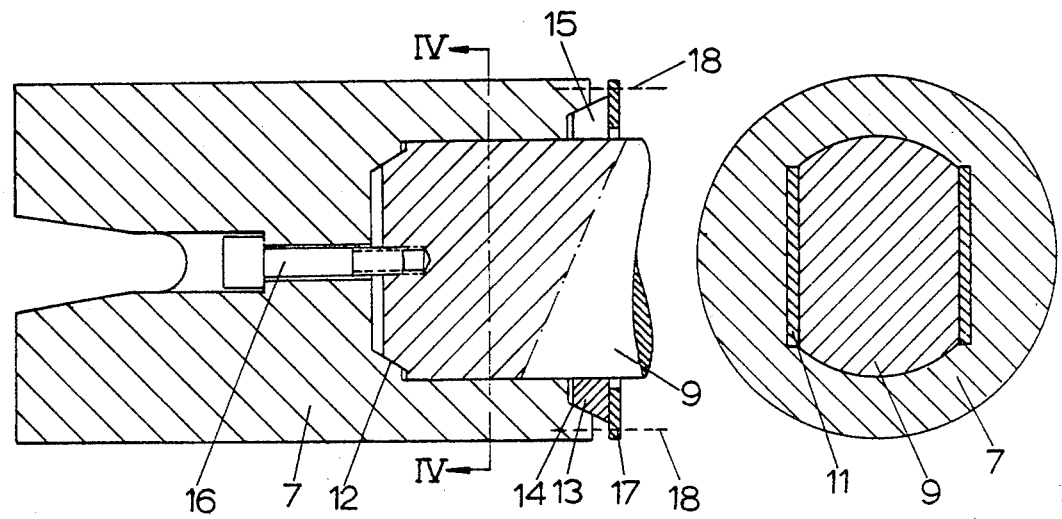
FIG. 3 shows in longitudinal section the connection of the roll and the connecting member according to the invention.
FIG. 4 is a cross-section of this connection on the line IV—IV in FIG. 3.

After the projection 9 has been inserted into the connecting member 7, the draw bolt 16 is first tightened so that the radial play at the end of projection 9 is removed. Thereupon the radial play at the mouth of the member 7 between this and the projection 9 is removed by pulling the conical surfaces 14 together by means of the hold-down ring 17 and the draw bolts 18. The split ring 13 is thus compressed to grip the projection 9 so that a rigid play-free joint is obtained.

What is claimed is:

1. In a coupling between a roll of a heavy rolling mill and a cardan shaft, wherein the roll and a connecting member are joined by a mortise-and-tenon joint with the roll having a projection with flat surfaces thereon and the connecting member having a recess to receive said projection, the joint being such as to prevent relative rotation and the leading end of the projection and the base of the recess having respectively a pair of mutually corresponding conical surfaces which are coaxial with the axis of the projection and are urged into engagement in order to align the axes of the roll and the connecting member, the improvement that, in order to achieve rigid coupling of the roll and the connecting member, there is provided a split ring which in unmounted condition is axially movable along the said projection and which is radially compressible by closure of the split or splits to grip the said projection, the ring and the mouth of the said recess having respectively a second pair of mutually corresponding conical surfaces which are coaxial with the axis of the projection, and there being provided first pulling means for drawing the first said pair of conical surfaces into engagement and second pulling means for drawing the said second pair of conical surfaces into engagement.

2. Coupling according to claim 1 wherein the first said pulling means comprises at least one draw bolt which passes through the connecting member into the end of the projection.

3. Coupling according to claim 1 or claim 2 wherein the second said pulling means comprises a hold-down ring extending around the projection and engaging the split ring and a plurality of draw bolts which draw said hold-down ring towards the connecting member.

* * * * *